US006616100B2

(12) United States Patent
Sankrithi

(10) Patent No.: US 6,616,100 B2
(45) Date of Patent: Sep. 9, 2003

(54) CARGO LOADING MEANS FOR SHORT BODY AIRPLANES

(75) Inventor: Mithra M. K. V. Sankrithi, Federal Way, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/969,786

(22) Filed: Oct. 2, 2001

(65) Prior Publication Data

US 2003/0062451 A1 Apr. 3, 2003

(51) Int. Cl.[7] ................................................. B64C 1/00
(52) U.S. Cl. ..................................... 244/119; 244/118.3
(58) Field of Search ........................... 244/118.1, 118.3, 244/137.1, 119

(56) References Cited

U.S. PATENT DOCUMENTS

| | | | | | |
|---|---|---|---|---|---|
| 2,242,201 | A | * | 5/1941 | Woods | 244/118.1 X |
| 2,425,498 | A | * | 8/1947 | Watter | 244/137.1 X |
| 2,572,442 | A | * | 10/1951 | Burnelli | 244/118.5 |
| 2,623,720 | A | * | 12/1952 | Fortunato | 244/106 |
| 2,759,691 | A | * | 8/1956 | Weaver et al. | 244/137.1 X |
| 2,811,323 | A | * | 10/1957 | Rethorst | 244/2 |
| 3,148,848 | A | * | 9/1964 | Price | 244/23 D |
| 3,799,479 | A | | 3/1974 | Roeder et al. | 244/137.1 |
| 4,149,626 | A | | 4/1979 | Holt | 198/718 |
| 5,086,996 | A | * | 2/1992 | Roeder et al. | 244/119 |
| 5,184,366 | A | * | 2/1993 | Rawdon et al. | 244/137.1 X |
| 5,335,880 | A | | 8/1994 | Klug | 244/118.3 |

FOREIGN PATENT DOCUMENTS

| | | | | |
|---|---|---|---|---|
| EP | 0 336 940 B1 | 9/1992 | | B64F/1/32 |
| EP | 0 395 459 B1 | 7/1993 | | B64C/1/22 |

* cited by examiner

*Primary Examiner*—Robert P. Swiatek
(74) *Attorney, Agent, or Firm*—Black Lowe & Graham PLLC

(57) ABSTRACT

A less-than-200-seat-class airplane includes a fuselage having a horizontal diameter value of a cross-section greater than a vertical diameter value of the cross-section. The cross-section is perpendicular to the longitudinal axis of the fuselage. The fuselage includes a passenger cabin and at least one cargo compartment located below the passenger cabin.

11 Claims, 9 Drawing Sheets

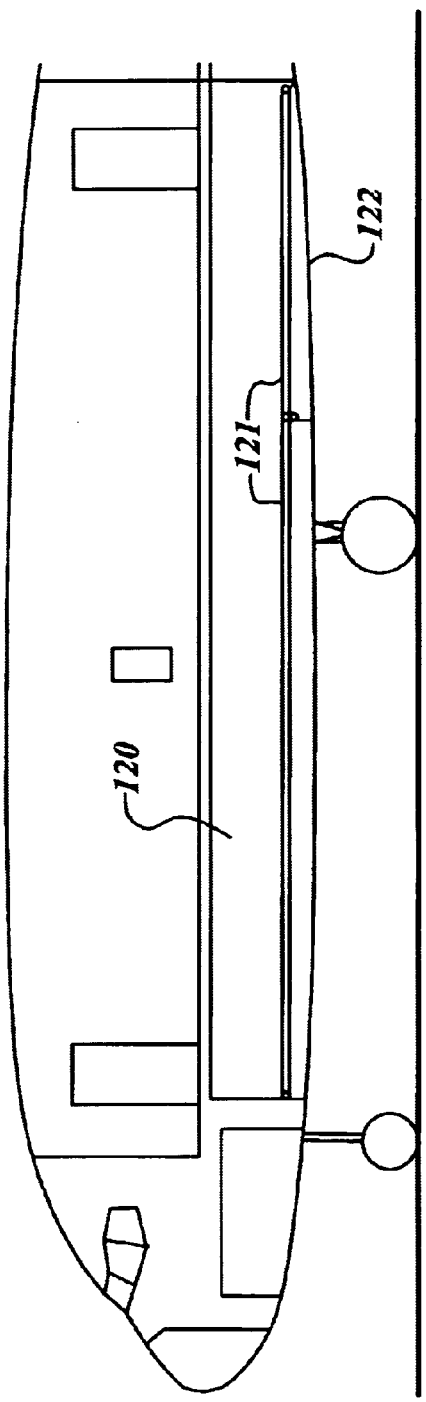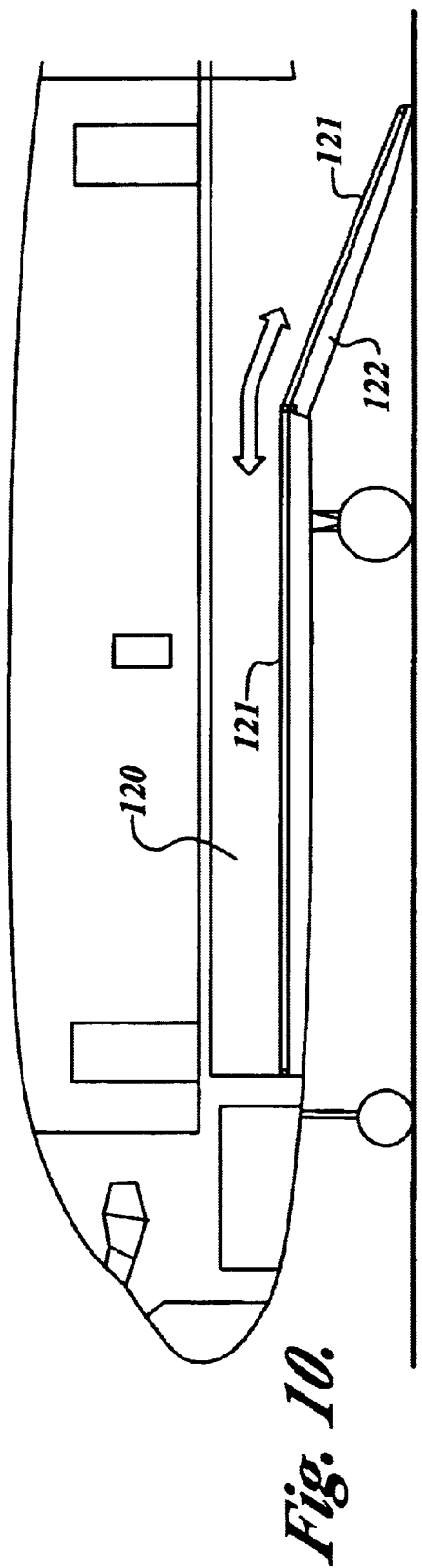
Fig. 9.
Fig. 10.

CARGO LOADING MEANS FOR SHORT BODY AIRPLANES

FIELD OF THE INVENTION

This invention relates generally to airplane design and, more specifically, to airplane cargo loading designs.

BACKGROUND OF THE INVENTION

Current commercial airplane families typically carry cargo (including passenger baggage and revenue cargo) in lower deck cargo compartments situated below a passenger cabin. These cargo compartments may be either "bulk" cargo compartments which are hand loaded with baggage, or "containerized" cargo compartments into which standard containers ("Unit Load Devices" or ULDs) or pallets are loaded. Cargo is typically loaded through a cargo door on the side of the airplane fuselage. The cargo door is usually of the upward hinging type.

When airplane body length is short (i.e., less than 200 seat class airplane), there is often insufficient space ahead of or behind the wing to conveniently locate cargo doors, while maintaining sufficient longitudinal separation from the wing, any wing-mounted engines, and passenger entry/cabin service doors.

Therefore, there exists a need for effective cargo compartment placement in smaller aircraft while providing sufficient clearance from passenger doors, engines, and wings.

SUMMARY OF THE INVENTION

The present invention provides cargo-loading means for short body airplanes. The cargo loading means permits effective cargo placement in smaller aircraft while providing sufficient clearance from passenger doors, engines, and wings.

A less-than-200-seat-class airplane includes a fuselage. The fuselage includes a passenger cabin and at least one cargo compartment located below the passenger cabin.

BRIEF DESCRIPTION OF THE DRAWINGS

The preferred and alternative embodiments of the present invention are described in detail below with reference to the following drawings.

FIGS. 9 and 10 are partial x-ray side views of a cargo bay door and loading mechanism formed in accordance with the present invention.

DETAILED DESCRIPTION OF THE INVENTION

Figure 1:
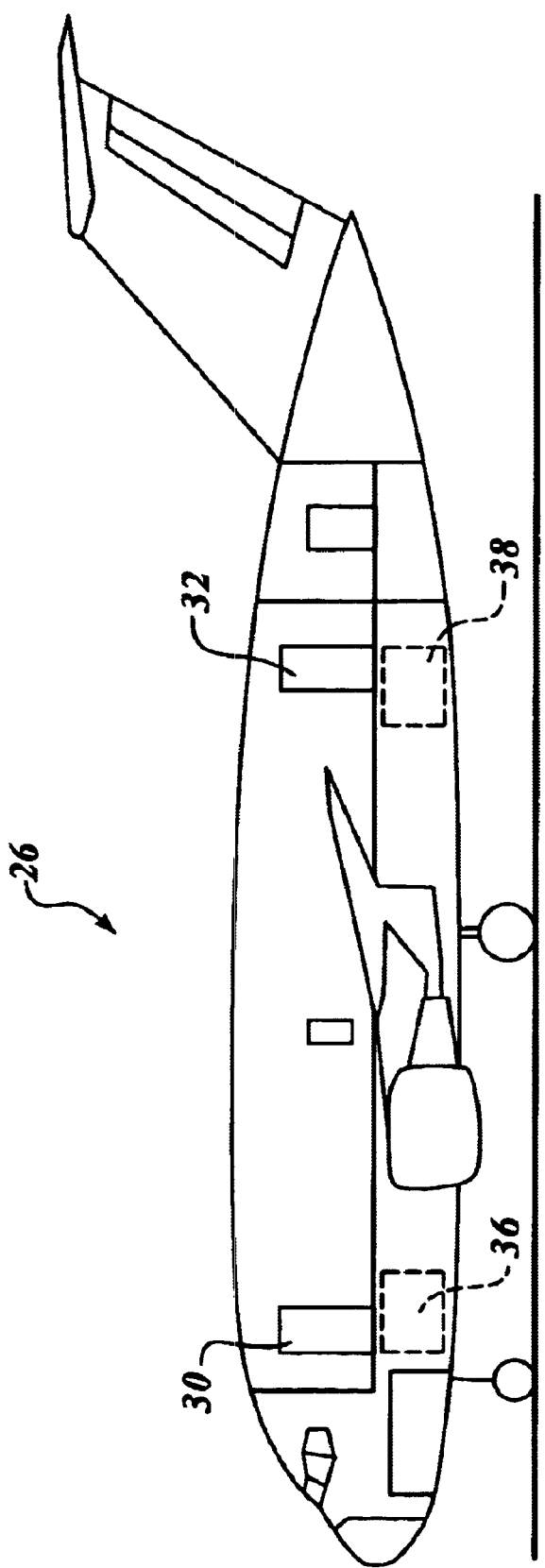
FIG. 1 is a is a partial x-ray side view of an airplane formed in accordance with the present invention.

The present invention provides cargo loading for a short body length airplane configuration, such as that shown in copending U.S. patent application Ser. No. (pending), attorney docket number BOEI-1-1016, filed Oct. 2, 2001, which is hereby incorporated by reference. As shown in FIG. 1, a short body low wing airplane 26 includes forward passenger cabin doors 30 and aft passenger cabin doors 32. The passenger cabin doors are suitably hinged to open either sideways or upwards, or mounted on a translating mechanism to swing outside the fuselage and then translate laterally, in order to avoid a cargo door interfering with the passenger cabin doors 30, 32, cargo doors 36, 38 are located below the passenger cabin doors 30, 32 and are shown in more detail in FIGS. 2–4 below.

Figure 2:
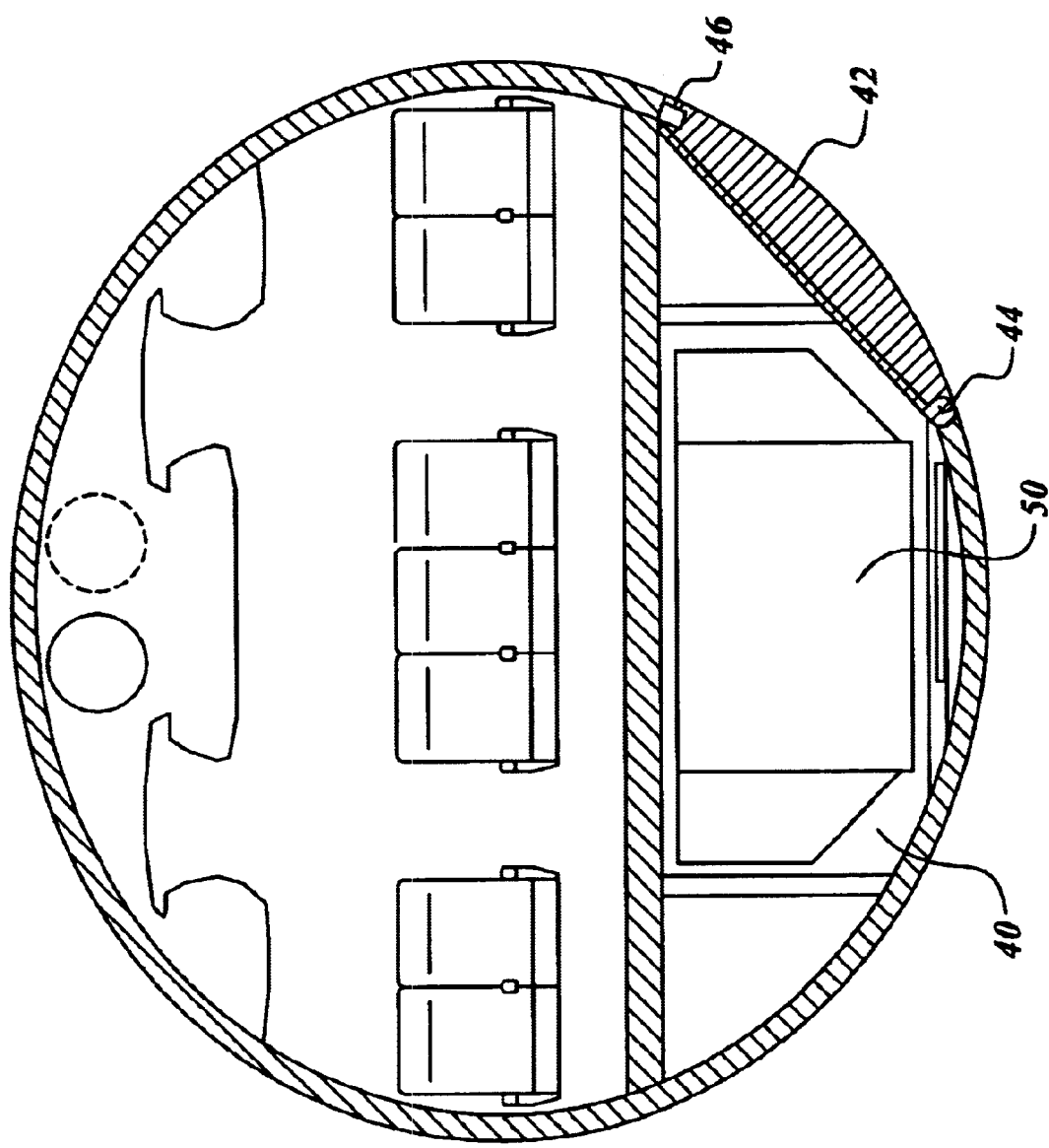
FIGS. 2 and 3 are cross-section views of the airplane shown in FIG. 1.
Figure 3:
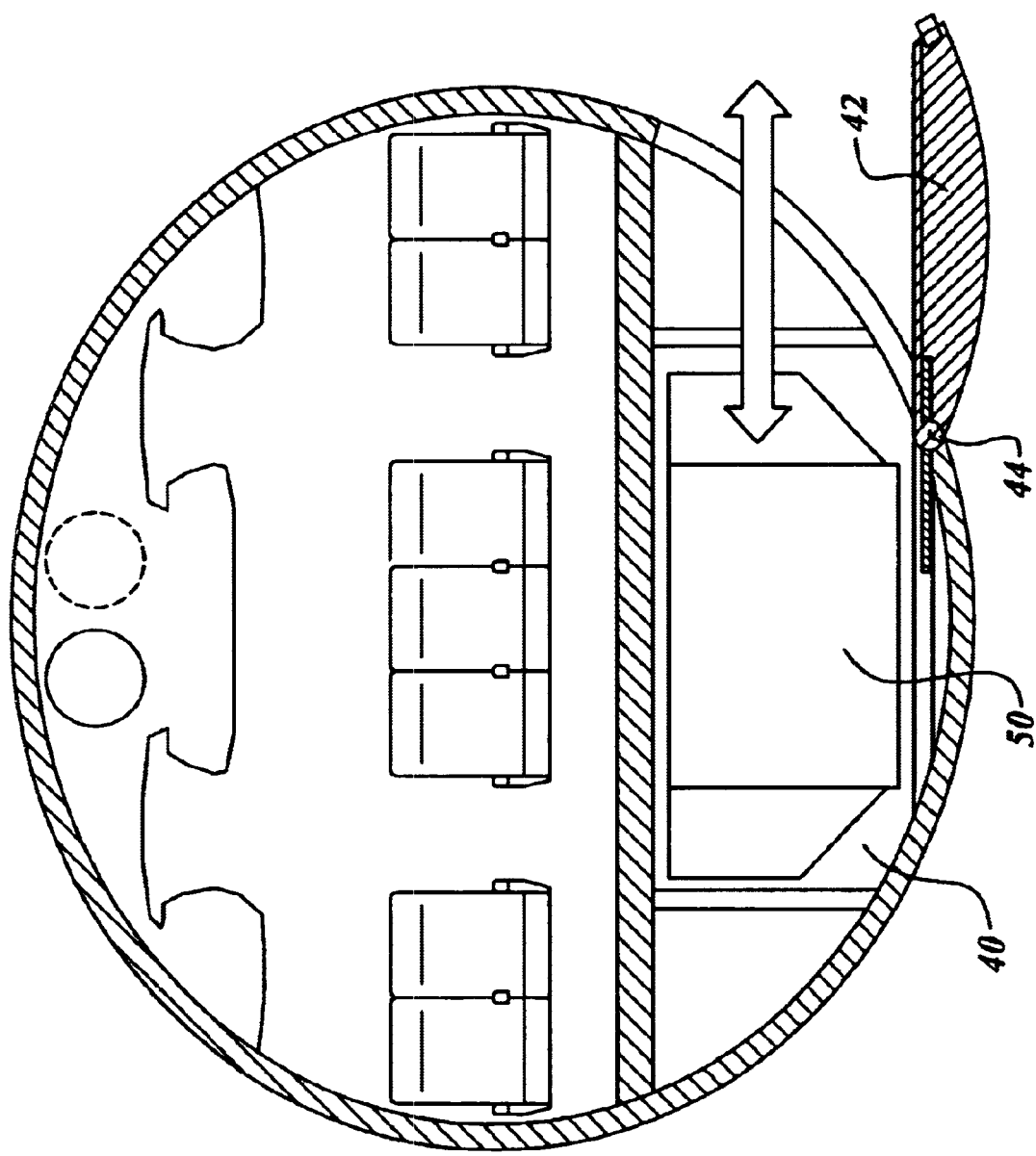
Figure 4:
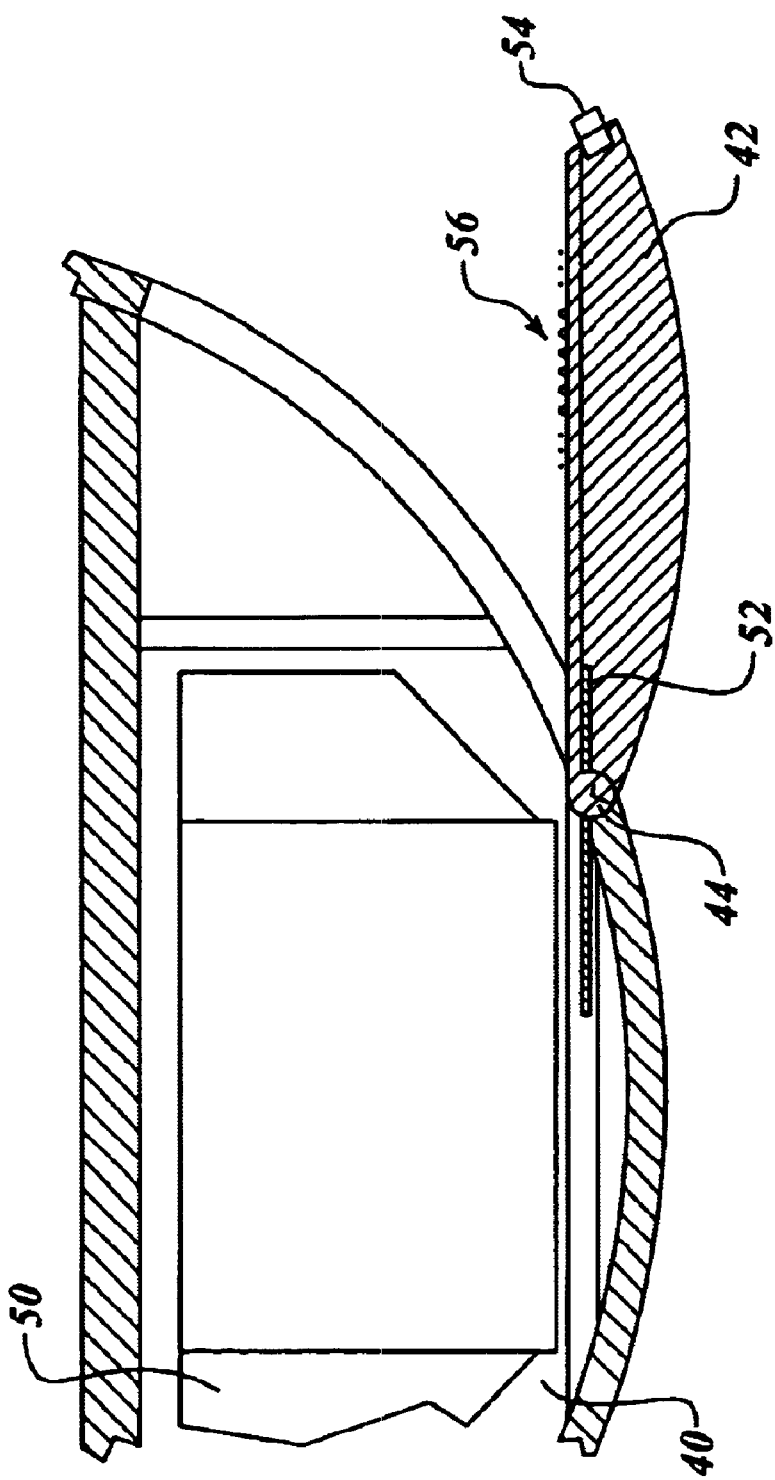
FIG. 4 is a partial zoom view of the view from FIG. 3.

FIG. 2 shows a cargo door 42 in the closed position. In the closed position a latch 46 at one end of the door 42 secures the door 42 shut. The end of the cargo door 42 opposite the end that includes the latch 46 is a hinge 44. The hinge 44 is located lower on the airplane fuselage than the latch 46 location, thereby allowing the door 42 to swing open down and away from the airplane's centerline, as shown in FIG. 3. FIG. 3 shows the cargo door 42 open, in a configuration suitable for loading and unloading a cargo container 50 into or from a cargo compartment 40 by translating it laterally into or out of the airplane's cargo compartment. By way of non-limiting example, the cargo container 50 is shown as an LD3-46 container. However, it will be appreciated that other types of cargo containers may be used as desired. FIG. 4 shows an enlargement of FIG. 3, and illustrates powered or unpowered rollers 56 to move the container 50 into or out of the cargo compartment 40 from or to a conventional cargo loader vehicle (not shown). A deployable bumper element 54 is shown deployed at the latch end of the door 42. The bumper element 54 softens the impact of contact when a cargo loader vehicle first mates with the cargo door 42 of the aircraft 26. A sensor device (not shown) connected at the end of the door 42 adjacent to the bumper element 54 detects any contact forces. A warning device, such as an audible alarm (not shown), warns flight and maintenance crews if any contact with the door 42 is excessive and may endanger the structural integrity of the cargo door 42 or the airplane 26. The door 42 is supported by locking bars 52. The locking bars 52 support and maintain the cargo door 42 in a desired, substantially horizontal open configuration for loading or unloading operations.

Not shown are suitable structural reinforcements for maintaining fuselage structural strength, with the main cabin door 30 or 32 and the cargo door 36 or 38 being one on top of the other.

Figure 5:
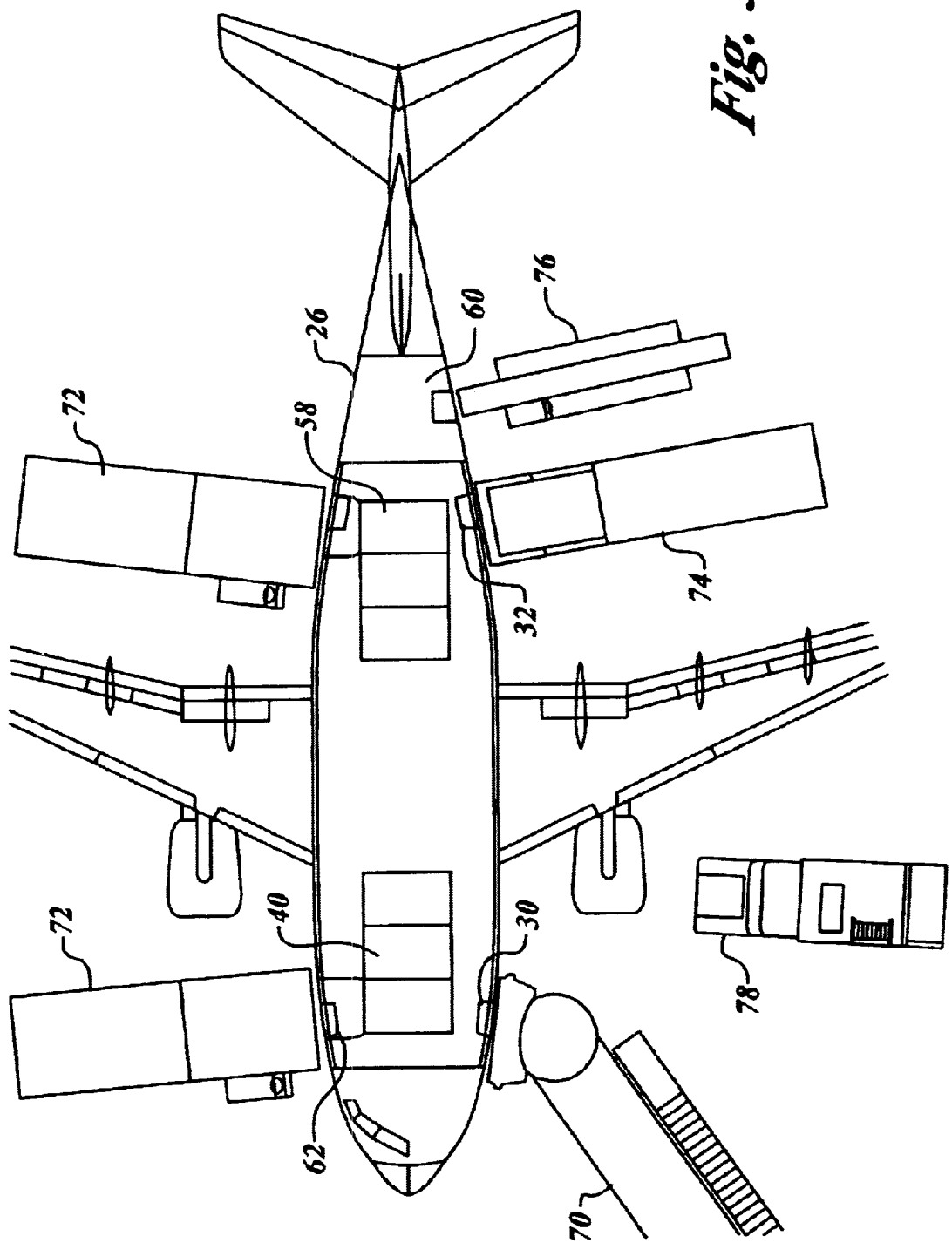
FIG. 5 is an x-ray top view of the airplane shown in FIG. 1.

FIG. 5 shows a top view of a typical Ground Service Equipment (GSE) laid out around the representative low-wing airplane 26 of FIG. 1, equipped with the above-described bottom hinged cargo doors 42 for loading and unloading cargo into and from the forward and aft lower deck cargo compartments. Even for this very short body airplane, it is possible to simultaneously load containerized cargo into a forward lower deck containerized cargo compartment 40, and an aft lower deck containerized cargo compartment 58, load bulk cargo into an aft bulk cargo compartment 60, load passengers through the main deck forward left cabin door 30, and provide galley and cleaning service through the main deck aft left cabin door 32. If it is undesirable to service a forward galley by moving carts through the cabin from the illustrated galley truck 74 location, alternately a galley truck 74 could be sequenced into the forward right main deck cabin door 62 either before or after cargo service has been provided to the forward cargo compartment 40.

While the cargo end door configuration of the present invention have been described with reference to the airplane 26, it will be appreciated that the above described cargo and door configurations can also be applied to other fuselage cross-sections and airplane configurations, within the spirit and scope of the invention.

Figure 6:
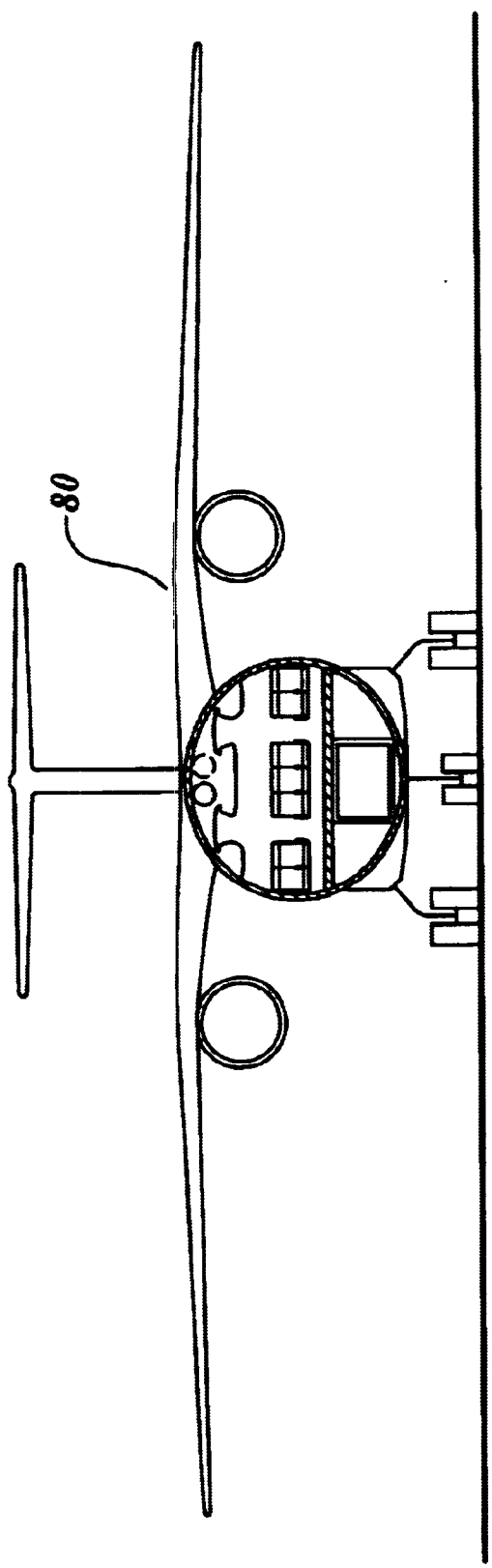
FIG. 6 is a cross-section front view of an alternate embodiment of the present invention.
Figure 7:
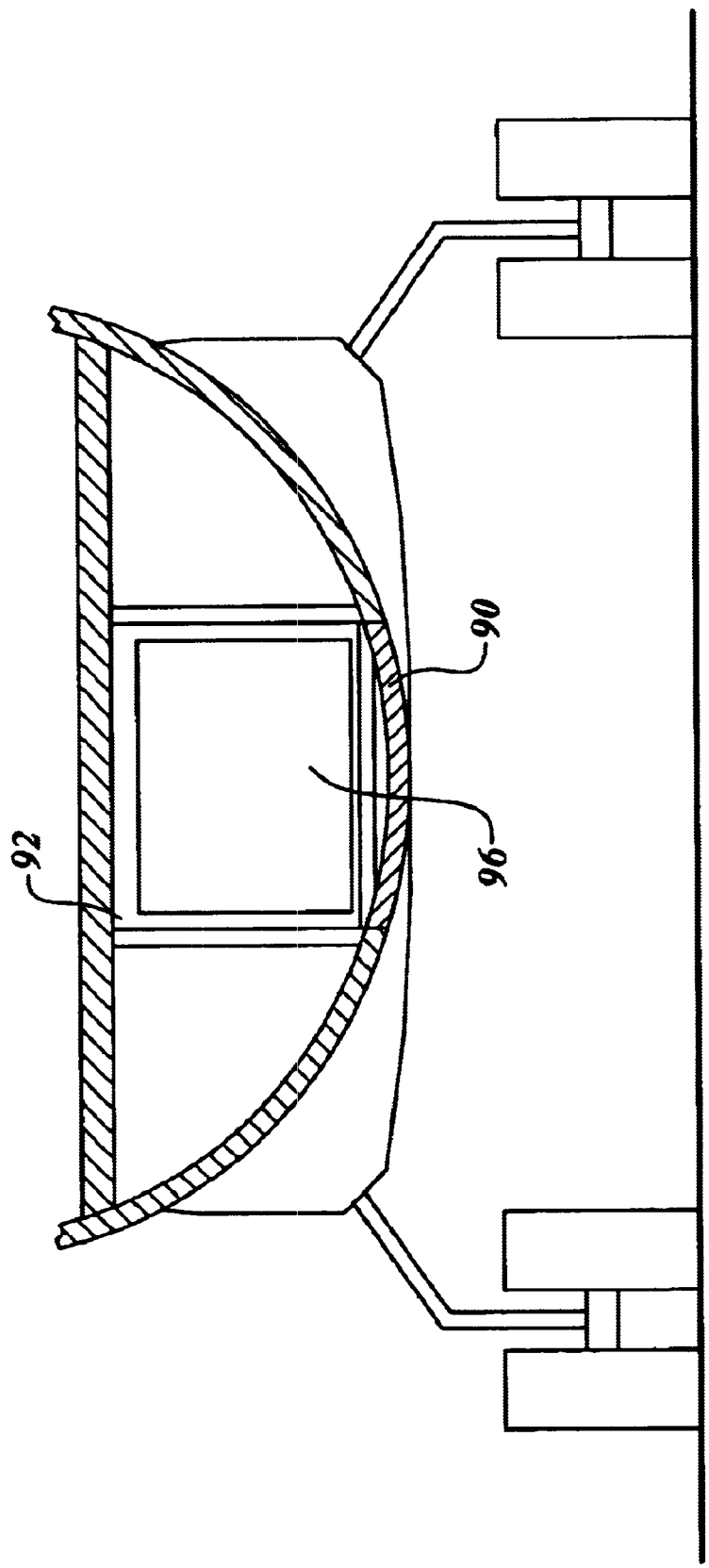
FIGS. 7 and 8 are partial cross-section views of a cargo loading door and section for the airplane shown in FIG. 1 or 6.
Figure 8:
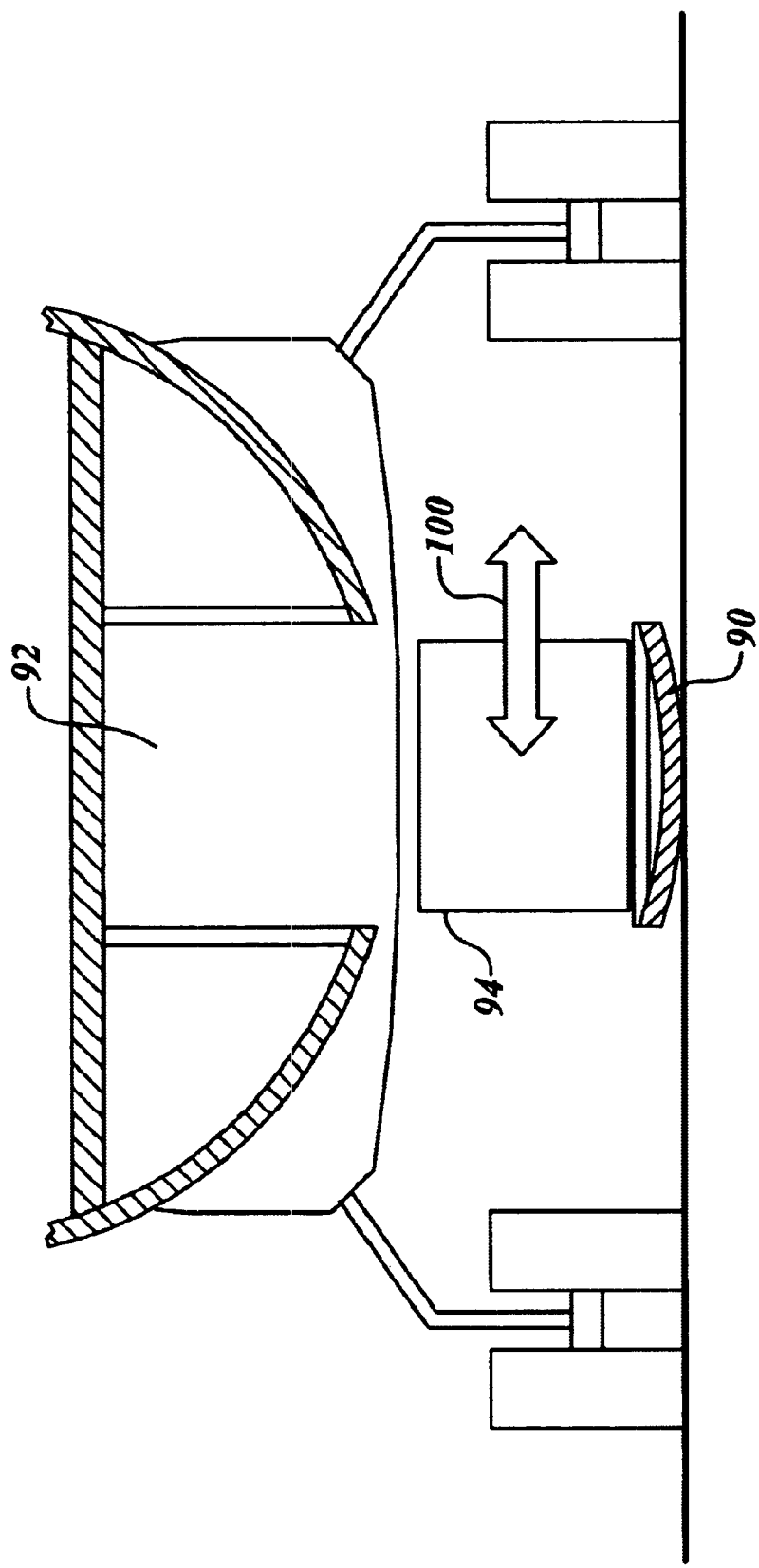

FIGS. 6–8 illustrates an alternate embodiment for cargo loading in a high-wing airplane 80 or a low-wing airplane 26 as shown in FIG. 1. As shown in FIG. 7, a cargo door 90 is located on the belly of the airplane 80 and is shown in the closed position. In the closed position latches (not shown) secure the door 90 to the fuselage. FIG. 8 shows the cargo door 90 open with a container 94 resting thereon. The translating cargo door 90 lowers a container supported by the door 90. The cargo compartment 92 and the door 90 include powered or unpowered rollers (not shown). Once the door 90 is open, the container 94 is translated laterally over the rollers onto a container dolly or a low-sill-height cargo loader vehicle (not shown).

FIGS. 9 and 10 illustrate another innovative approach to enabling cargo loading for a short body length airplane. This alternate approach applies preferably to a high-wing airplane configuration, such as the airplane 80. A lower deck bulk cargo compartment 120 includes a conveyor belt floor surface 121 for supporting cargo. The conveyor belt floor surface 121 includes an aft portion supported by a ventral cargo door 122, which is shown in closed and open configurations respectively in FIGS. 9 and 10. Use of the conveyor belt floor surface 121 enables automated loading and unloading thus reducing or eliminating risk of back injuries to cargo loading personnel. This concept can also apply to airplane configurations with a small cargo compartment height.

While certain preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A less-than-200-seat-class comprising:
    a single hull fuselage having a horizontal diameter value of a cross-section greater than a vertical diameter value of the cross-section, the cross-section being perpendicular to the longitudinal axis of the fuselage, the fuselage comprising:
        a passenger cabin; and
        at least one cargo compartment located below the passenger cabin,
    wherein the at least one cargo compartment includes one or more cargo doors located on a side of the fuselage and hinged on a bottom edge of the door to rotate about an axis that is substantially parallel to a longitudinal axis of the airplane.

2. The airplane of claim 1, wherein the passenger cabin comprises one or more doors.

3. The airplane of claim 2, wherein the cargo doors are located under the passenger doors.

4. The airplane of claim 1, further comprising a support device configured to keep the cargo door in a cargo loading position.

5. The airplane of claim 4, further comprising a loading aid device configured to aid in loading and unloading cargo into and out of the cargo compartment.

6. The airplane of claim 5, wherein the loading aid device comprises a plurality of rollers.

7. The airplane of claim 6, wherein at least a portion of the plurality of rollers are powered.

8. The airplane of claim 4, wherein the cargo loading position includes the cargo door in a position to automatically receive cargo from a cargo loading device.

9. The airplane of claim 8, wherein the position of the cargo door to automatically receive cargo is substantially horizontal to ground.

10. The airplane of claim 1, wherein the cargo compartment is configured to receive at least one Unit Load Device.

11. The airplane, comprising:
    a generally oval single fuselage having a longitudinal axis and defining an enclosed volume, wherein at least a portion of the fuselage in which there is capacity of seat passengers above stowed cargo has a cross-section that is longer side-to-side than high top-to-bottom;
    a floor within the enclosed volume defining a passenger seating compartment and a cargo stowage compartment;
    at least one passenger door opening through the fuselage for access to the passenger compartment; and
    at least one cargo door opening through the fuselage for access to the cargo stowage compartment, the cargo door including a hinge generally aligned parallel to the longitudinal axis for moving the door from a closed position sealing the fuselage to an open, cargo loading position providing access to the cargo compartment for cargo to be moved over and supported on the open door.

\* \* \* \* \*